United States Patent [19]
Shimizu et al.

[11] 3,816,344

[45] June 11, 1974

[54] PROCESS FOR PRODUCING A CATALYST

[75] Inventors: Shozo Shimizu; Tetsumi Iwase, both of Okazaki; Hideki Hara; Ryuzo Hori, Toyota; Shigenori Sakurai, Toyota, all of Japan

[73] Assignee: Toyota Jidoshe Kogyo Kabushiki Kaisha, Toyota-cho, Toyota-City, Aichi Prefecture, Japan

[22] Filed: June 23, 1972

[21] Appl. No.: 265,449

[30] Foreign Application Priority Data
Nov. 22, 1971 Japan.......................... 46-93834

[52] U.S. Cl.............. 252/455 R, 252/458, 252/460, 252/466 PT, 252/470, 252/474
[51] Int. Cl...... B01j 11/40, B01j 11/32, B01j 11/08
[58] Field of Search.. 252/460, 466 PT, 474, 455 R, 252/477 R

[56] References Cited
UNITED STATES PATENTS

| | | | |
|---|---|---|---|
| 2,123,732 | 7/1938 | Keitel............................ | 252/460 X |
| 2,475,155 | 7/1949 | Rosenblatt.......................... | 252/460 |
| 2,760,940 | 8/1956 | Schwarzenbek.............. | 252/466 PT |
| 2,927,088 | 3/1960 | Michalko et al................ | 252/460 X |
| 3,437,426 | 4/1969 | Quesda........................... | 252/460 X |

*Primary Examiner*—G. F. Dees
*Attorney, Agent, or. Firm*—Stevens, Davis, Miller & Mosher

[57] ABSTRACT

A film of a noble metal is deposited on the surface of a carrier without substantial penetration of the carrier by immersing the carrier first in a dilute solution of a salt of the noble metal, removing the carrier and heating and drying it to produce precipitation cores of the noble metal on the surface of the carrier, and then immersing the carrier with the precipitation cores in a solution of a noble metal salt which also contains a reducing agent for the salt and a stabilizer for the solution. The film of noble metal thus produced on the surface is adherent thereto and is highly active as a catalyzer for removing pollutants from the exhaust gas of an automobile.

10 Claims, No Drawings

PROCESS FOR PRODUCING A CATALYST

This invention relates to a process for producing a catalyst or catalyzer to be used for various chemical reactions, particularly for producing a catalyst for the purification of automobile exhaust gas. More specifically, the invention relates to an economical method of depositing a highly active noble metal on a ceramic or other heat-resistant inorganic carrier for a noble metal catalyst such as platinum, rhodium or palladium.

It is advisable to remove the poisonous components of automobile exhaust gas such as carbon monoxide (CO), hydrocarbons (H.C.) and nitrogen oxide (NO.) to avoid air pollution. For this purpose, a catalyzer converter system which promotes the following oxidization or reduction reactions is employed:

$$CO + O_2 \rightarrow CO_2$$
$$H.C. + O_2 \rightarrow H_2O + CO_2$$
$$NOx + CO \rightarrow N_2 + CO_2$$

Catalysts which may be used for these reactions include base metals such as copper, chromium, nickel, manganese, vanadium, cobalt or one of the noble metals such as, for example, platinum, palladium and rhodium.

The conventional method for producing this type of carrier-catalyzer is to impregnate the carrier with a solution which contains the catalytic metal. The metal may be activated by any appropriate means such as by heating or with a reducing agent. The catalyzer thus obtained, however, has been found to have the following disadvantages:

1. The catalytic activity is due primarily to the catalyst deposited on the carrier surface, but the catalyzer metal applied by impregnation penetrates the carrier so deeply that its efficiency drops to as low as 10–15 percent. In other words, only a small percentage of the metal can contribute to catalysis.
2. Depending upon the area of the carrier, the degree of impregnation differs and it is hard to obtain a homogeneous product. Therefore, in the past practice, impregnation must be repeated several times in order to obtain uniform distribution of the metal. Moreover, the metal is not always adhesively secured to the carrier and the two are liable to fall apart, reducing the effective life of the catalyst.
3. The impregnation process takes a long time. Usually, from 5 to 6 hours are required, but depending on the type of carrier and the purpose, twenty or more hours may be required.
4. The mode and conditions of post-treatment following the impregnation have so great a bearing on the catalyst activity that it is difficult to repeatedly produce a good quality product.

A new method for making a catalyst has been disclosed in Japanese Pat. Publication Sho 46–22442. In accordance with the disclosed method, a catalyst carrying a base metal such as copper, nickel, chromium, or zinc is produced by a chemical plating process. A series of steps, including sensitization, activation and nonelectrolytic precipitation are required. The reaction involves reducing palladium chloride with stannous chloride and precipitating palladium on a core metal.

As illustrated in Table 1, however, base metals are not as effective as the noble metals as a catalyst. The noble metal may be as much as ten or more times as effective as the base metal.

TABLE 1.—COMPARISON OF CATALYZER ACTIVITY BETWEEN VARIOUS METALS

| Metals (Noble) | Purifying efficiency (percent) | | Metals (Base) | Purifying efficiency (percent) | |
|---|---|---|---|---|---|
| | $C_3H_8$ | CO | | $C_3H_8$ | CO |
| Pt | 71.3 | 100 | Cu | 12.8 | 95.0 |
| Pd | 79.5 | 100 | Ni | 16.6 | 76.0 |
| Rh | 70.7 | 95.2 | Co | 28.2 | 97.0 |

The catalysts of Table 1 were carried on γ-alumina grains. Each carrier contained 0.2 weight percent noble metal and 10 weight percent base metal.

Test conditions for measurement were as follows:

Gas composition —

$C_3H_8$(570 ppm)+CO(1.2 percent)+$O_2$ (2 percent) +$N_2$ (balance)

Flow rate — 1.5 l/min.
Catalyzer bed temperature — 350° C
Space velocity — 18,000 $hr^{-1}$.

Thus the noble metals are highly effective elements as a purifying catalyzer for exhaust gases, but they are so expensive that it is extremely important to make effective use of them with high material efficiency. The present invention has been perfected by the inventors through persistent efforts to eliminate the drawbacks to the conventional method.

It is therefore an object of this invention to provide a catalyst which is more effective than base metals like those of Table 1. Another object of the invention is to provide a method for depositing a noble metal on a carrier to produce a catalyst of improved effectiveness for use in removing harmful gases from the exhaust gas of an automobile. A further object of the invention is to provide a method for depositing a noble metal as a film over a carrier surface without substantial penetration of the carrier by the metal. A more specific object of the invention is to provide a simple but effective method for depositing a catalytic metal on the surface of a carrier therefor.

The foregoing objects and others are accomplished in accordance with this invention, generally speaking, by providing a method for depositing a noble metal on a catalyst carrier wherein the carrier is first immersed in a solution of a salt of the noble metal, removed and dried whereby precipitation cores of the metal salt are deposited on the surface of the carrier and the carrier is then immersed in a solution of a noble metal salt, a reducing agent and a stabilizer, removed from the solution and dried. A substantially uniform adherent film of activated noble metal catalyst is applied to the surface of the carrier without substantial penetration of the carrier by the noble metal. Consequently, the metal is so disposed on the surface of the carrier that it is available for catalysis of chemical reactions which remove poisonous gases such as hydrocarbons, carbon monoxide and nitrogen oxides from exhaust gas of an automobile. In other words, since the noble metal is confined primarily to the surface of the carrier, substantially all of it is available for contact by the exhaust gases as they flow rapidly over the carrier in the exhaust system of an automobile.

According to the present invention, since the noble metal catalyst is carried only on the carrier surface, the amount of metal required is less than that required by the impregnation method, yet the catalysis obtained is more than equivalent to that of the impregnated carrier and the material efficiency is extremely high. The catalyst provided by this invention is particularly advantageous for purification of automobile exhaust gas because such gas travels at such a high velocity chemical reaction is limited to the vicinity of the external surface of the carrier. Moreover, the adhesion of metal to the carrier is much greater than that of metal deposited on a carrier by impregnation because the reducing reaction forms a noble metal film directly on the rough surface of the carrier. The conventional method takes a fairly long time for impregnation, but according to the present invention the catalytic noble metal film can be formed in a few minutes. Moreover, the catalytic film needs no post treatment except drying and can be used immediately without reduction or heat treatment to activate the catalyst. Thus in terms of net manufacturing time, the method provided by this invention is ⅓ to ¼ as long as the conventional impregnation method.

The process provided by the invention can be divided into the steps of carrier pretreatment, precipitation core seeding and catalyzer-film formation. The carrier pretreatment serves two purposes. One purpose is cleaning of the carrier and this may be done in the same manner as the conventional pretreatment of a common metal surface. The other purpose is to counteract any catalyst poison which may have infiltered the carrier during its manufacture. This can be done by neutralization and heating. After the pretreatment, ample washing and drying is needed to remove all of the treating solution. This pretreatment, however, may be skipped in some instances depending upon the carrier manufacturing method, the carrier surface condition and the type and use of the carrier.

Next comes the precipitation-core seeding process in which the carrier surface is seeded with growth cores for the noble metal in the subsequent deposition of the catalytic film of noble metal. An aqueous solution of a salt of noble metal without a reducing agent for the salt may be used for this purpose.

Finally, a solution containing a noble metal salt, a stabilizer and a reducing agent which has been adjusted to an adequate range of concentrations is brought into contact with the carrier by immersion or other method to form a catalytic noble metal film on the surface of the carrier. The carrier and film are then heated and dried to provide a catalyst ready for use in the exhaust system of an automobile.

Any suitable carrier may be used for the present invention. Preferably, alumina, silica, magnesia or mixtures thereof, such as ceramics, are used. However, a metal may also be employed as the carrier. When ceramics are used as the carrier, harmful substances such as sulfur radicals or phosphorus which may poison the catalyst should be neutralized with, say, 28 percent ammonia water. Any undesirable organic matter should be removed by heating the carrier to 500°–600° C. As mentioned above, depending on the type of carrier or the state of its surface, some carriers may need pretreatment; in this pretreatment, however, use of a chemical which is likely to produce a catalyst poison like sulfuric acid should be avoided.

A dilute solution of a noble metal is used for precipitation-core seeding the carrier surface to promote the precipitation by chemical reduction and uniform growth of noble metal film during the film forming step. Examples are aqueous solutions of a nitrate or a hydrochloride of gold, platinum, rhodium or palladium at a concentration of from 0.0005 to 0.1 mol per liter. The concentration should be limited to 0.1 mol per liter, because at a higher concentration than this, the noble metal will diffuse in the solution in the next step before precipitation with the result that aging of the solution is promoted and a loss of expensive noble metal occurs.

The solution for precipitation seeding may be employed as neutral aqueous solution, but in order to obtain a high concentration of a salt of low water solubility, it is better to add nitric acid or hydrochloric acid at a rate of 5 to 100 milliliters per liter of solution. The nitric acid and hydrochloric acid concentration suggested is based on the use of 60 percent nitric acid or 35 percent hydrochloric acid for addition to the noble metal salt solution. The temperature may be room temperature. Heating to 50°–60° C will accelerate subsequent precipitation of the catalytic metal, but if the temperature is too high, aging will be promoted. Thus the most desirable range of temperatures is 15°–25° C. Use of an alkaline complex salt instead of a nitrate or a hydrochloride is also possible.

In the common chemical plating process, stannous chloride is employed for palladium seeding to precipitate a metal on the non-conductive surface. According to the present invention, however, the catalytic noble metal is obtained by simply immersing the carrier in a thin solution of a noble metal. This avoids poisoning of the catalyst by stannous chloride.

The working principle of the catalytic noble metal film being formed is as follows: The noble metal salt solution is stabilized by a stabilizing agent mainly composed of a complexing agent and a chelating agent and a reducing precipitation is caused by some appropriate reducing agent to grow around the cores previously seeded on the carrier surface. Thus, the main point lies particularly in the selection of the three components to be combined.

In the following, the three components, i.e., noble metal salt, stabilizing agent and reducing agent are to be described.

Suitable metal salts include chloroplatinic acid, platinum chloride, palladium chloride, palladium nitrate, palladium sulfate, palladium tetraamine, rhodium chloride, rhodium sulfate, rhodium nitrate and the like. The quantity of noble metal salt used in the solution will vary some depending upon the particular salt used, but it will usually be within the range of 0.005 to 0.1 mol per liter of solution. The preferred amount is from about 0.01 to 0.05 mol noble metal salt per liter of solution. Particularly when a precipitation with a wide surface area is required, the ratio of reducing agent to noble metal salt must be reduced.

The stabilizing agent is adopted to prevent natural decomposition of the solution. The noble metal salt may be reduced to the metal by the reducing agent if no stabilizing agent is present in the solution. In other cases, a too rapid decomposition of the solution may occur during film formation and shorten the life of the solution. Thus, the stabilizing agent is added to the solution so that the solution will remain stable without change, except by deposition of metal on the carrier while it is immersed therein. The solution is decomposed as the result of the reducing agent in the solution combining with metal ions or of the metal ions settling due to the pH change, etc. To prevent this, the pH change is inhibited by adding a weak acid with a certain dissociation constant, for example, an organic acid or its alkaline salt. These additives can work not only as a pH buffer, but also as a complexing agent for metal ions. Free metal ions in excess of the reducing agent may be complexed by the complexing agent to avoid decomposition. But if the complexing agent used is one that produces too stable a complex substance, the concentration of the free metal-ions becomes too low and the rate of precipitation is retarded. Thus, in the selection of a complexing agent, the reactivity of a complex substance obtained as well as its dissociation constant must be taken into account.

For these reasons, the stabilizing agents available include the disodium salt of ethylenediamine tetraacetic acid and Rochelle salt, which form a complex compound of a noble metal; and hydroxycarboxylic acids that form a stable metal chelate, namely, glycollic acid, malic acid, lactic acid, tartaric acid, citric acid and the like. When a greater stability is required, it is advisable to choose an acid with many carboxylic radicals in the molecule, such as citric acid. The sodium salt of polycarboxylic acids may be used for higher solubility. Other suitable stabilizing agents include inorganic ammonium salts of a basic nature such as ammonium chloride, ammonium nitrate and ammonium sulfate. Also effective are fatty ketones and fatty sulfites; for instance, methyl ethyl keton, acetone and 2,2-dithioethanol. The necessary quantity of stabilizer differs depending upon the substance employed, but commonly, it is in the range of 0.001–0.5 mol per liter of solution or preferably 0.005–0.01 mol per liter. Suitable reducing agents include formalin, sodium formate, sodium hypophosphite, hydrazine, hydrosulfite, hydroboric acid, sodium borohydride hydroquinone, urea and the like. There is considerable variation in the reducing ability of such compounds. If the wrong material is selected and combined with the wrong stabilizer, the noble metal may fail to precipitate at all or, on the contrary, may precipitate too fast to deposite on the carrier and as a result, it may be dispersed in a colloidal form in the solution. The required quantity of reducing agent is 0.05–0.5 mol per liter and for the best results, it should be 0.1–0.2 mol per liter. When great quantities of reducing agent are to be used, they must be added at a rate matching the rate of reaction.

The following working examples illustrate embodiments of the present invention:

Example 1. Palladium-carrying catalyzer:

As the carrier, γ-alumina grains are used. They are carefully washed with distilled water; dried and then fired at 600°C for two hours in an electric furnace. After being left to cool, they are immersed for about 20 minutes at room temperature in a solution of palladium chloride having a concentration of about 1 gram per liter and containing about 10 milliliters hydrochloric acid per liter. Then they are dried in hot air and again in the electric furnace for 30 minutes at 140° C. The resulting seeded carrier, which provides cores for precipitation, is immersed in a solution which has been prepared by dissolving 2 grams of palladium chloride in about 300 ml of 28 percent ammonia water to form a solution of an ammonium complex salt tetramine palladium, adding thereto a stabilizer, i.e., 5g of the disodium salt of ethylenediamine tetra acetic acid, then adding pure water to make one liter of solution. Just prior to use, several drops of hydrated hydrazine are added to the solution as a reducing agent. The solution at room temperature reacts with a vigorous generation of hydrogen gas upon immersion of the seeded carrier and in a few minutes palladium is reduction-precipitated on the carrier surface, thus producing the desired catalyzer.

Example 2. Platinum-carrying catalyzer:

γ-alumina grains are used as the carrier. They are completely washed with distilled water; dried and then fired in an electric furnace at 600° C for 2 hours. After being left to cool, the carrier is immersed for about 20 minutes at room temperature in a solution of 10 grams chloroplatinic acid per liter. Then it is exposed to hot air and again dried in an electric furnace for 30 minutes at 140° C, thereby seeding the carrier surface with cores of noble metal for precipitation. A solution of 2g chloroplatinic acid and 1g disodium salt of ethylenediamine tetra acetic acid in about 500 ml of water is prepared. A solution of 4g sodium formate and 9g sodium carbonate anhydride in about 100 ml of water is also prepared. These two solutions are combined to make 1 liter of a mixture just before the resulting solution is to be used. The solution is heated to 80°–85° C. When the above-mentioned seeded carrier is immersed in this mixture, a vigorous generation of hydrogen gas occurs and in about 10 minutes the desired catalyzer with a gray, thin film of platinum is obtained.

Example 3. Chromium-palladium carrying catalyzer.

About 200 ml of water are heated to about 60° C and 17g of chromium fluoride are dissolved therein. After complete dissolution, about 200 ml of water are added and an additional 1g of chromium chloride and 9g of sodium citrate are dissolved therein to make a total volume of 1 liter. Then, using a one normal solution of caustic soda, this solution is adjusted to a pH of 9±0.5, heated to about 95° C and mixed with 9g of sodium hypophosphite to make a processing solution. In the same way as in Example 1, a preliminarily seeded carrier is immersed in this processing solution for about 10 minutes and a gray chromium film is formed on the carrier surface.

Thereafter, the carrier is washed with water and then palladium is precipitated by the method of Example 1, thereby yielding the desired catalyzer. In this case, precipitation-core treatment is not needed.

The catalyzer thus obtained is evaluated for its catalytic activity under the same conditions as in Table 1. It is found that the propane conversion rate is 93.2 percent and the carbon monoxide purification efficiency is 100 percent.

TABLE 2

Measuring Conditions for Catalyzer Ability

| Carried metal | Palladium | Space velocity | 10,000-$^1$hr |
|---|---|---|---|
| Carried amount | 0.1 weight % | Gas temperature | 300°C |
| Size | Diameter 30 mm Length 50 mm | CO | 1% |
| Material Bulk | "cordierite" | $O_2$ | 4% |

| | | |
|---|---|---|
| specific gravity | 0.67 | $N_2$ Balance |

Example 4. Application to honeycomb-structure carrier:

Under the above conditions and using a mini-reactor, the warm-up characteristic of a honeycomb-structure carrier, which had been provided with a film of palladium by the method of Example 1, was tested to determine the time needed for 100 percent purification of CO. The results were excellent, being 5 minutes against 7 minutes for PTX, i.e., the American Engelhard's platinum catalyzer.

Example 5. Practical service test:

The catalyzer used in Example 4 was prepared to the same size as the American Engelhard's PTX No. 4 and under the test conditions specified by the Federal Test Process 1975 LA No. 4 mode, its gas purification ability was measured using an 1,800 CC engine. The results are given in Table 3.

TABLE 3

Service Test Results (unit: g/mile)

| Gas Catalyzer | CO | HC |
|---|---|---|
| Engelhard's PTX No. 4 | 4.5 | 0.55 |
| Present invention | 3.5 | 0.45 |

As explained above, in the conventional method of impregnation the deposited metal salt is post-treated with a reducing agent or by heating to produce the catalyzer effect; and depending on the conditions of this treatment, there is wide variation in the catalytic effect produced. By contrast, according to the present invention, a noble metal directly provides the catalyst layer; therefore, if the moisture penetrating fine pores can be removed by appropriate means, it will directly make a stable catalyst than can effectively exhibit the catalytic action.

A carrier of unit structure like a honeycomb carrier is extremely useful as a catalyst for purifying automobile exhaust gas because its vessel is easy to manufacture, it suffers little pressure loss, it possesses good warm-up characteristics, and it is free from abrasion wear. For maintenance of a unit structure, however, the carrier should be built of a strong material. Commonly preferred γ-alumina for grain carrier, which has a surface area of more than 100 m²/g and has a high water absorption is hard to use; poor water absorbers with less than 10 m²/g surface area such as α-alumina, cordierite or spodumenmullite are preferred. These materials, however, are complex in structure and are not suitable for evenly distributing the catalyst component; besides, it is difficult to make them carry the catalyst component by the impregnation method.

For this reason, platinum with less surface area but greater effect has been selected heretofore as the preferred catalyst component; and it has been attempted to impregnate as much platinum as possible through immersion for a long time or under reduced pressure. Thus, in the presently commercialized unit structure catalyzer, for instance, the American Engelhard's PTX, platinum is present even at a depth where it takes no part in the reaction, the total platinum content amounting to as much as 0.3–0.5 weight percent — which is extremely economically unfavorable.

When a carrier of unit structure is made to carry a catalyzer according to the present invention, however, only the surface of the carrier is coated evenly with a highly adhesive catalytic metal film in a short time; and thus, in spite of the fact that the catalyst content is low, a high catalytic activity can be assured. Besides, according to the present invention, a coating with a noble metal other than platinum, say, palladium can give as high activity as one with platinum. Moreover, the present invention, even when applied to a carrier coated appropriately with a metal such as copper, nickel, cobalt, or chromium, or when additionally coated with a thin film of a metal oxide of copper, nickel, cobalt or chromium, can be equally effective or even synergistically effective. Particularly a noble metal coat applied by the present invention is so full of pores that, when later immersed in a highly penetrating liquid, say, in a chromic acid solution, it permits penetration of the liquid into its depth; thus, when roasted, it can produce a synergist effect of chromium and a noble metal.

Although the invention has been described in detail for the purpose of illustration, it is to be understood that such detail is solely for that purpose and that variations can be made by those skilled in the art without departing from the spirit and scope of the invention except as it may be limited by the appended claims.

What is claimed is:

1. A process for producing a catalyst, which comprises seeding a carrier by immersing said carrier in a first dilute solution containing a salt of a metal, drying the wet carrier by heating to thereby allow a precipitation core to deposit on the carrier surface and then, immersing the thus obtained carrier in a second solution containing a salt of the noble metal, a reducing agent selected from the group consisting of formalin, sodium formate, sodium hypophosphite, hydrazine, hydrosulfite, hydroboric acid, sodium borohydride, hydroquinone and urea and a stabilizer selected from the group consisting of the disodium salt of ethylene diamine tetra acetic acid, Rochelle salt, sodium glycolate, sodium malate, sodium lactate, sodium tartrate, sodium citrate, ammonium chloride, ammonium nitrate, ammonium sulfate, methyl ethyl ketone, acetone and 2,2-dithio-ethanol, to thereby form a film of the noble metal on the carrier surface.

2. A process for producing a catalyst according to claim 1 wherein said carrier is selected from the group consisting of alumina, silica, magnesia and mixtures thereof and metals.

3. A process for producing a catalyst according to claim 1 wherein said metal salt for the first immersion step is selected from the group consisting of gold chloride, platinum chloride, rhodium chloride, palladium chloride, gold nitrate, platinum nitrate, rhodium nitrate, and palladium nitrate.

4. A process for producing a catalyst according to claim 1 wherein said noble metal salt for said second solution is selected from the group consisting of chloroplatinic acid, platinum chloride, palladium nitrate, palladium sulfate, tetraamine palladium, rhodium chloride, rhodium sulfate and rhodium nitrate.

5. The process of claim 1 wherein the said first dilute solution contains chromium fluoride.

6. The process of claim 1 wherein the said first dilute solution contains chromiun chloride.

7. A method for producing a catalyst according to claim 1 wherein said solution of metal salt for the first immersion step has a concentration of 0.0005 to 0.1 mol per liter.

8. A method for producing a catalyst according to claim 1 wherein concentration of said metal salt in said second solution for catalyzer film formation is 0.005 to 0.1 mole per liter.

9. A method for producing a catalyst according to claim 1 wherein concentration of said reducing agent in said solution is 0.05 to 0.5 mol per liter.

10. A method for producing a catalyst according to claim 1 wherein concentration of said stabilizer in said solution is 0.001 to 0.05 mol per liter.

* * * * *

UNITED STATES PATENT OFFICE
CERTIFICATE OF CORRECTION

Patent No. 3,816,344    Dated June 11, 1974

Inventor(s) Shozo Shimizu et al.

It is certified that error appears in the above-identified patent and that said Letters Patent are hereby corrected as shown below:

The correct name of the Assignee is:

-- TOYOTA JIDOSHA KOGYO KABUSHIKI KAISHA --.

Signed and sealed this 29th day of October 1974.

(SEAL)
Attest:

McCOY M. GIBSON JR.
Attesting Officer

C. MARSHALL DANN
Commissioner of Patents